United States Patent [19]
Alburn et al.

[11] 3,912,807
[45] Oct. 14, 1975

[54] TREATMENT OF DIABETES USING SOMATOSTATIN AND INSULIN

[75] Inventors: Harvey E. Alburn, West Chester; Norman H. Grant, Wynnewood; Donald E. Clark, Norristown, all of Pa.

[73] Assignee: American Home Products Corporation, New York, N.Y.

[22] Filed: Apr. 18, 1974

[21] Appl. No.: 462,148

[52] U.S. Cl. ............................. 424/178; 424/177
[51] Int. Cl.² ................... A61K 37/26; A61K 37/00
[58] Field of Search ...... 260/112.5, 112.7; 424/177, 424/178

[56] References Cited
UNITED STATES PATENTS

| | | | |
|---|---|---|---|
| 2,849,370 | 8/1958 | Petersen et al. | 424/178 |
| 2,882,203 | 4/1959 | Petersen et al. | 424/178 |
| 3,014,842 | 12/1961 | Schlichtkrull | 424/178 |
| 3,060,093 | 10/1962 | Poulsen et al. | 424/178 |
| 3,089,815 | 5/1963 | Lieb et al. | 424/178 |
| 3,091,573 | 5/1963 | Schlichtkrull | 424/178 |

OTHER PUBLICATIONS

Vale et al. C. R. Acad. Sc. Paris, 275 D, 2913–2916 (1972).
Brazeau et al. Science, 179, 77–79 (1973).
Burgus et al. Proc. Nat. Acad. Sci. USA, 70, 684–688 (1973).

*Primary Examiner*—Lewis Gotts
*Assistant Examiner*—Reginald J. Suyat
*Attorney, Agent, or Firm*—David E. Frankhouser

[57] ABSTRACT

An injectable composition comprising insulin combined with somatostatin, reduced somatostatin, or polymeric reduced somatostatin in water is described as being useful for the treatment of diabetes mellitus.

10 Claims, No Drawings

TREATMENT OF DIABETES USING SOMATOSTATIN AND INSULIN

This invention relates to the use of insulin in combination with the tetradecapeptide somatostatin, its linear reduced form, or its polymeric reduced form in the treatment of diabetes mellitus.

Somatostatin is the cyclic disulfide tetradecapeptide of the formula:

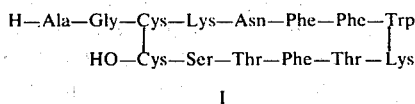

I

This peptide (I) has been identified as the "somatotropin-release inhibiting factor" (SRIF) which is secreted by the hypothalamus and regulates the secretion of pituitary growth hormone (GH) (somatotropin). [See Brazeau et al., Science, 179, 77 (1973), Burgus et al., Proc. Nat. Acad. Sci. (USA), 70, 684 (1973), and Ling et al., Brochemical and Biophysical Res. Communication, 50, 127 (1973)]. The reduced form of somatostatin (RS) is the linear tetradecapeptide of the formula:

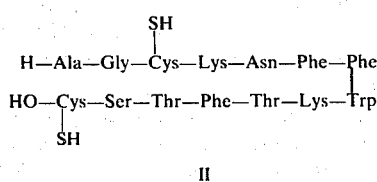

II

The reduced form (II) has been prepared by total synthesis and has been found to possess the biological activity of naturally occuring somatostatin. [See Rivier et al., C.R. Acad. Sci. Ser. p. Sci. Natur. (Paris), 276, 2737 (1973) and Sarantakis and McKinley, Biochem. and Biophys. Res. Communications, 54, 234 (1973)]. Reduced somatostatin has been shown to abolish the elevation of serum GH concentration induced in normal human subjects by the administration of L-dopa and arginine. [See Siler, J. Clin. Endocrinol. Metab., 37, 632 (1973)]. The reduced form (II) can be converted to somatostatin (I) by oxidation whereby a bridging bond is formed between the two sulfhydryls of the two cysteinyl amino acid residues in the tetradecapeptide. The synthetic somatostatin has been shown to have the same biological activity as naturally occuring somatostatin. [See Rivier et al. supra and Sarantakis and McKinley, supra.]

Polymeric reduced somatostatin (PRS) is described in the U.S. Patent application of Norman H. Grant and Dimitrios Sarantakis entitled "Polymeric Growth-Hormone-Release-Inhibitory Factor", Ser. No. 462,149, filed April 18, 1974. Polymeric reduced somatostatin is a polymer containing from about 0.090 to about 1.0 milliequiv. free sulfhydryl groups per millimole of polymer, having a molecular weight of from 3,636 to about 182,000, bonded by Cys 3-3, Cys 3-14, and Cys 14-14 disulfide linkages, and defined by the formula:

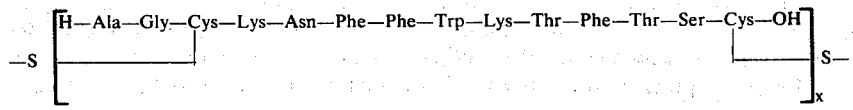

where $x$ is an integer from 2 to 100, inclusive.

The polymeric reduced somatostatin is prepared by oxidizing reduced (linear) somatostatin H-Ala-Gly-Cys(SH)-Lys-Asn-Phe-Phe-Trp-Lys-Thr-Phe-Thr-Ser-Cys(SH)-OH to produce disulfide linkages with the free mercapto groups of the cysteine[3] and cysteine[14] moieties. The oxidation is conducted in aqueous medium at ambient temperature, at pH 4 to 10, preferably 6 to 10, adjusted as needed with conventional buffer systems. The reaction time varies with the oxidant employed, from a very short time of about 5 minutes to 8 hours with chemical oxidants to between 5 minutes and 4 days when atmospheric oxygen is employed as the oxidant.

The applicable oxidants for the process of this invention include oxygen, either uncatalyzed as present in the atmosphere, or in a catalyzed system wherein the catalyst is one of the cupric, ferrous, cobaltous, manganous or selenite $(SeO_3)^{-2}$ ion or one of the known fungal enzymes; hydrogen peroxide noncatalyzed or catalyzed as by the cupric or ferrous ions; sulfoxides; such as dimethysulfoxide; azo compounds, such as

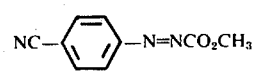

or $(CH_3)_2NCON=NCON(CH_3)_2$; nitro compounds, such as tetranitromethane; methylene blue; tetrazolium salts; chloranil; dichlorophenol; dithiobis(thioformates); iodine; the bromate or iodate ion; flavins; cytochrome; dehydroascorbic acid; or by radiation with X-rays of β-rays. Each of these oxidant systems have been employed in one form or another to oxidize mercaptans to dithio ethers in the past, and the techniques employed are known to the polypeptide chemist.

The use of insulin in the treatment of the metabolic manifestations of diabetes (such as hyperglycemia, polyuria, polydipsia, and weight loss) is well established. [See Chapter 31 Drugs of Choice, 1972-1973, Walter Modell, Editor, C. V. Mosby Co, St. Louis, 1972, pages 466-470, and Chapter 71, The Pharmacological Basis of Therapeutics, 3d Ed., L. S. Goodman and A. Gilman, Editor, Macmillan Co., N.Y., 1966, pages 1579-1594.] The administration of insulin does not, however, treat the angiopathic complications of diabetes (such as retinopathy, nephropathy, neuropathy, and accelerated atherosclerosis and arteriosclerosis). It has been suggested that the hypersecretion of GH (somatotropin) may be a casual factor in the development of angiopathies. [See Lundback et al., Lancet, July 18, 1970, pp. 131-133.] The suppression of plasma GH by the administration of somatostatin to normal as well as diabetic subjects has been demonstrated, and it has been suggested that somatostatin may be used to treat the diabetic angiopathies which are not affected by insulin. [See Prange-Hansen et al., British Med. Journal, 3, 523 (1973)].

In accordance with the present invention there is provided a method for treating diabetes mellitus in a warm-blooded mammal which comprises administering parenterally to said mammal an effective amount of an injectable composition comprising insulin combined in water with at least one of a member of the class consisting of somatostatin, reduced somatostain, or polymeric reduced somatostatin. The method of the invention offers the advantage of permitting the treatment of both the metabolic manifestations of diabetes and the angiopathic complications by the injection of a single medicament.

Special mention is made of the following specific embodiments of the above-defined method:
 a method wherein the insulin is combined with somatostatin;
 a method wherein the insulin is combined with reduced somatostatin;
 a method wherein the insulin is combined with polymeric reduced somatostatin.

The growth hormone release-inhibiting activity of the somatostatin, reduced somatostatin, or polymeric reduced somatostatin in the compositions hereinabove-described can be determined by radioimmunoassay in a rat pituitary cell culture system. [See Grant et al. *Biochemical and Biophysical Research Communications*, 51, 100 (1973)].

Using such a method, it was found that insulin does not interfere with the growth hormone release-inhibiting activity of somatostatin, reduced somatostatin, or polymeric reduced somatostatin. In fact, there is evidence that insulin may enhance the growth hormone release-inhibiting activity of somatostatin, since somatostatin combined with insulin was found by radioimmunoassay in rat pituitary cell cultures to be more active in inhibiting release of growth hormone than somatostatin alone. Under the same conditions, insulin showed no significant inhibition of growth hormone release. Hence, the combination of somatostatin and insulin may be superior to somatostatin alone for the treatment of the angiopathic complications of diabetes.

It will be appreciated that the insulin used in the method of the invention can be in any pharmaceutically acceptable form, such as those described on pages 1592–1594 of the Goodman and Gilman reference, supra. Of special interest are the long acting forms of insulin — protamine-zinc insulin or protamine-aluminum insulin. Protamine-zinc insulin or protamine-aluminum insulin can be prepared by methods well known in the art. The long-acting forms can be used alone or in combination with insulins of short duration.

Reduced somatostatin or polymeric reduced somatostatin can also be employed in the compositions described herein in the form of their protamine-zinc or protamine-aluminum complexes. Such forms are preferred if a long-acting effect is desired. The protamine-zinc and protamine-aluminum complexes of RS and PRS can be made in a manner conventional in polypeptide chemistry for similar polymers (e.g. insulin). Thus, for example, protamine sulfate and zinc chloride is admixed with RS or PRS in a phosphate-buffered aqueous solution in any desired amount and the product forms as a gel or stable suspension at ambient temperature. The same procedure is followed to prepare the protamine-aluminum complex of RS or PRS. The protamine-zinc complex of reduced somatostatin is described by Brazeau et al., *Endocrinol.*, 94, 184 (1974).

When it is desired to employ mixtures of insulin with RS or insulin with PRS in the form of their protamine-zinc or protamine-aluminum complexes, such complexes can be conveniently prepared by treating a solution containing a mixture of insulin with RS or with PRS with the complexing reagents. For example, insulin, reduced somatostatin, protamine sulfate and zinc chloride can be combined in water solution in the presence of disodium phosphate at pH 8.8 to give a suspension of the desired protamine-zinc complexes.

The weight ratio of insulin (MW 6000) to somatostatin (MW 1818), to reduced somatostatin (MW 1820), or to polymeric reduced somatostatin (MW 3,636 to about 182,000) in the compositions used in the method of the invention and the dose of said compositions will depend upon the following:
 a. whether the diabetes to be treated if of the "juvenile" type or "maturity-onset" type;
 b. the severity of the hypoglycemia and other metabolic symptons;
 c. the severity of the angiopathic complications; and
 d. the weight and diet of the subject under treatment.

In general, the effective dose of the compositions employed in the method of the present invention is that which will maintain the serum or urinary glucose concentration and serum growth hormone concentration within normal limits. Serum GH concentrations can be determined by radioimmunoassay, [See Siler et al., *J. Clin. Endocrinol Metab.*, 37, 632 (1973)] while serum or urinary glucose concentrations can be determined by conventional procedures.

In general, weight ratios of insulin to somatostatin, reduced somatostatin, or polymeric reduced somatostatin from about 0.07 to about 500 are contemplated. The dose by subcutaneous or intramuscular administration is about 0.05 to about 2 units of insulin per kg. body weight and about 0.15 $\mu$g to about 0.7 mg. of somatostatin, RS, or PRS per kg. of body weight per day. Preferred ranges are about 0.1 to about 0.4 units of insulin and about 1 to 10 $\mu$g of somatostatin per kg. of body weight per day.

In practicing the method of the invention, the pharmacologically active substances are administered in sterile aqueous solutions, suspensions, or gels suitable for injection. Such aqueous preparations may contain various pharmaceutically acceptable excipients, for example, sodium chloride, glycerin, buffering agents (such as acetate or phosphate buffer), or preservatives (such as phenol).

The somatostatin, RS, or PRS used in compositions may be in the form of a non-toxic pharmaceutically acceptable acid addition salt, such as the hydrochloride, hydrobromide, sulfate, phosphate, maleate, acetate, citrate, benzoate, succinate, malate ascorbate, pamoate, or tannate salts.

The following examples are illustrative of the invention.

EXAMPLE 1

To a vial containing 250 $\mu$g of somatostatin was added 1.25 ml of protamine solution (200 mg. salmine protamine sulfate +250 mg $Na_2HPO_4$, adjusted to pH 8.8 with sodium hydroxide and brought to 50 ml) and 4.2 mg insulin (Elanco). The slightly turbid solution was stirred for 5 minutes, after which 1.25 ml of zinc solution (52 mg $ZnCl_2$ in 50 ml $H_2O$) was added. The resulting suspension was stirred at room temperature for 1 hour, then stored at 4° until tested as follows.

Samples of the formulation prepared as described above were diluted in Earle's Balanced Salt solution to give suspensions containing 50 and 5 ng/ml. of somatostatin. The suspensions (5 ml) were added to confluent monolayer cultures of rat pituitary cells, and the cultures were incubated at 37°C in a 95% air-5% $CO_2$ atmosphere for 3 hours. Supernatant solutions were then assayed by radioimmunoassay for growth hormone release. [See Grant et al., Biochemical and Biophysical Research Communications, 51, 100 (1973)].

Control radioimmunoassays for GH were run using Earle's solution (no somatostatin and insulin) and with Earles's solution containing somatostatin (no insulin). The results of the above-described test are set forth below:

| Concentration (ng/ml)* | | GH Secreted |
|---|---|---|
| Somatostatin | Insulin | (ng/ml)** |
| None | None | 284 ± 20 |
| 50 | 840 | 152 ± 9 |
| 50 | None | 183 ± 9 |
| 5 | 84 | 194 ± 6 |
| 5 | None | 215 ± 19 |

*As uncomplexed component
**Mean ± S.E.M.

EXAMPLE 2

Solutions containing insulin (Elanco) and somatostatin at various concentrations are prepared by dissolving the ingredients in Earles Balanced Salt solution. The solutions so prepared were added to confluent monolayer cultures of rat pituitary cells and the release of growth hormone was assayed as described in Example 1. Controls were run using Earles solution (no somatostatin and insulin) and with Earles solution containing somatostatin (no insulin). The results are set forth below:

| Experiment No. | Concentration (ng/ml) | | GH Secretion |
|---|---|---|---|
| | Somatostatin | Insulin | (ng/ml)* |
| 1 | None | None | 641 ± 71 |
| | 500 | None | 93 ± 3 |
| | 500 | 4000 | 63 ± 10 |
| 2 | None | None | 309 ± 5 |
| | 100 | None | 279 ± 43 |
| | 100 | 100 | 216 ± 27 |
| | 10 | None | 264 ± 15 |
| | 10 | 100 | 181 ± 15 |
| | 1 | None | 306 ± 19 |

-Continued

| Experiment No. | Concentration (ng/ml) | | GH Secretion |
|---|---|---|---|
| | Somatostatin | Insulin | (ng/ml)* |
| | 1 | 100 | 268 ± 21 |
| | None | 1000 | 351 ± 27 |
| | None | 100 | 307 ± 37 |
| 3 | None | None | 410 ± 33 |
| | 50 | None | 285 ± 32 |
| | 50 | 2000 | 215 ± 12 |
| | 50 | 200 | 210 ± 17 |
| | 50 | 20 | 239 ± 14 |

*Mean ± S.E.M.

What is claimed is:

1. A method for treating diabetes mellitus in a warm-blooded mammal which comprises administering parenterally to said mammal an effective amount of an injectable composition comprising insulin combined in water with at least one of a member of the class consisting of somatostatin, reduced somatostatin, or polymeric reduced somatostatin.

2. The method as defined in claim 1 wherein insulin is combined with somatostatin.

3. The method as defined in claim 1 wherein insulin is combined with reduced somatostatin.

4. The method as defined in claim 1 wherein insulin is combined with polymeric reduced somatostatin.

5. A method as defined in claim 1 wherein the insulin is in the form of a complex with protamine-zinc or protamine-aluminum.

6. A method as defined in claim 1 wherein the somatostatin, reduced somatostatin, or polymeric reduced somatostatin is in the form of a complex with protamine-zinc or protamine-aluminum.

7. The method as defined in claim 1 wherein the insulin and the somatostatin, reduced somatostatin or polymeric reduced somatostatin are in the form of a complex with protamine-zinc or protamine-aluminum.

8. A method as defined in claim 7 wherein the insulin and somatostatin are in the form of a complex with protamine-zinc or protamine-aluminum.

9. A method as defined in claim 7 wherein the insulin and reduced somatostatin are in the form of a complex with protamine-zinc or protamine-aluminum.

10. A method as defined in claim 7 wherein the insulin and polymeric reduced somatostatin are in the form of a complex with protamine-zinc or protamine-aluminum.

* * * * *